Nov. 28, 1961 W. S. PEASE 3,010,497
POTATO SLICING MACHINE
Filed July 9, 1958 3 Sheets-Sheet 1

INVENTOR.
WARREN S. PEASE
BY
ATTORNEY

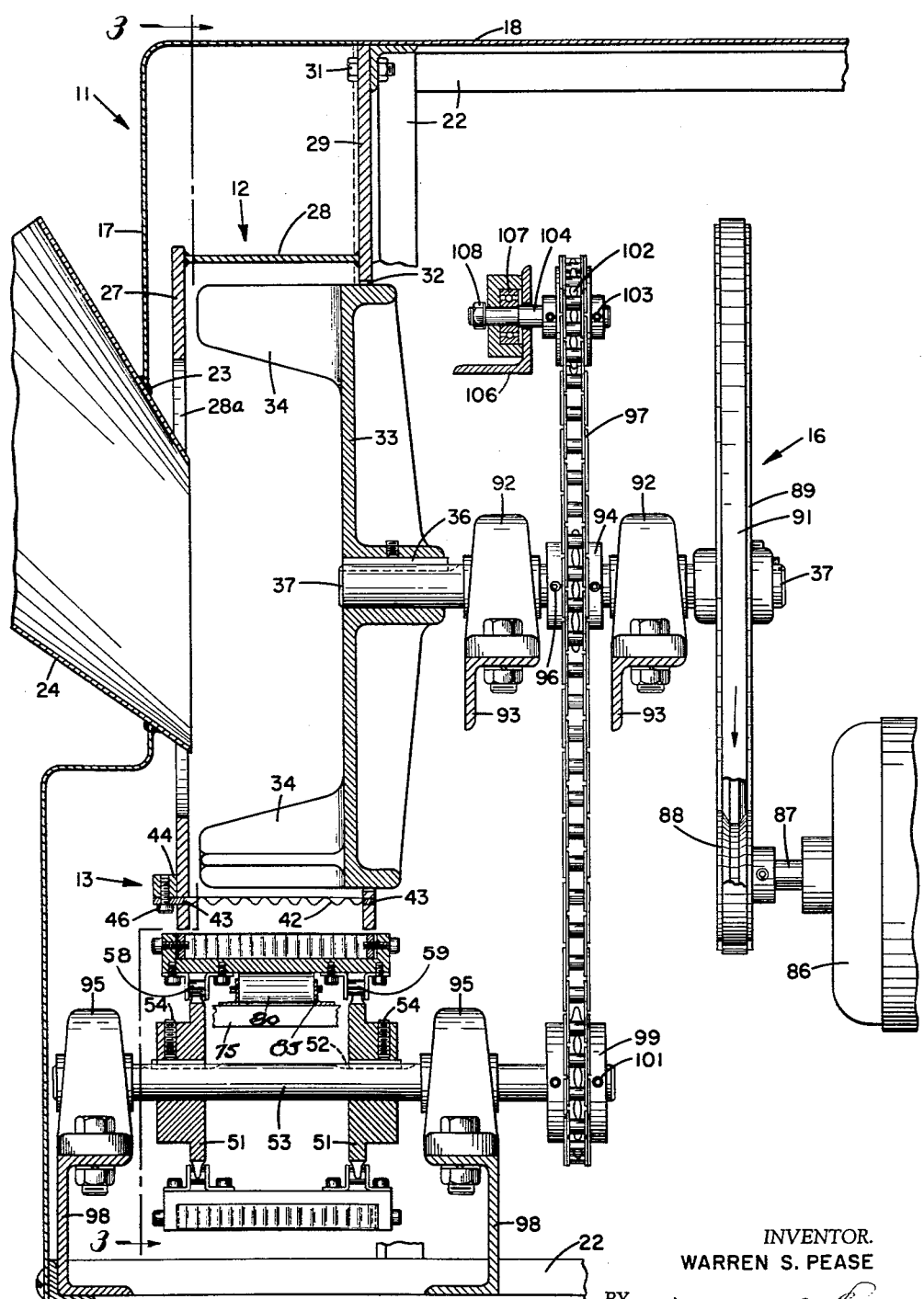

Nov. 28, 1961   W. S. PEASE   3,010,497
POTATO SLICING MACHINE
Filed July 9, 1958   3 Sheets-Sheet 3

INVENTOR.
WARREN S. PEASE
BY
ATTORNEY

United States Patent Office 3,010,497
Patented Nov. 28, 1961

3,010,497
POTATO SLICING MACHINE
Warren S. Pease, Honeoye Falls, N.Y., assignor to F. B. Pease Company, Rochester, N.Y., a corporation of New York
Filed July 9, 1958, Ser. No. 747,399
6 Claims. (Cl. 146—78)

The invention relates to a potato slicing machine and more particularly to a machine for producing crinkle cut potatoes for French frying. Reference is made to the patents of Bernard Woodward, Nos. 2,832,387 and 2,884,974, and to the patent of Bernard Woodward and Winslow E. Thomson, No. 2,859,784, all three patents being entitled "Potato Slicing Machine."

An object of the invention is to provide a machine, inexpensive to manufacture and efficient in operation adapted to produce from peeled whole potatoes sliced potatoes for French frying.

Another object of this invention is to provide a machine inexpensive to manufacture and efficient in operation and adapted to produce crinkled sliced potatoes in large quantities, suitable for French frying.

My invention further contemplates a machine having a casing into which whole peeled potatoes are discharged, the casing having mounted therein propelling means for forcing the potatoes against a knife located at a discharge gap to cut the potatoes into slabs, the machine further including a conveyor movable through a path of travel which path includes a position adjacent said discharge gap, the conveyor carrying a multiplicity of knives adapted to pick up the slabs and the slabs being forced between the knives by suitable means to cut the slabs into frying sized pieces and the knives carrying the sliced pieces to a discharge position where the sliced potatoes are discharged from the machine into a suitable receptacle.

Other objects and advantages of this invention will be particularly set forth in the claims and will be apparent from the following description, when taken in connection with the accompanying drawings, in which:

FIG. 2 is an enlarged vertical sectional view of the machine taken substantially on the line 2—2 of FIG. 1 in the direction indicated by the arrows;

Figure 1:
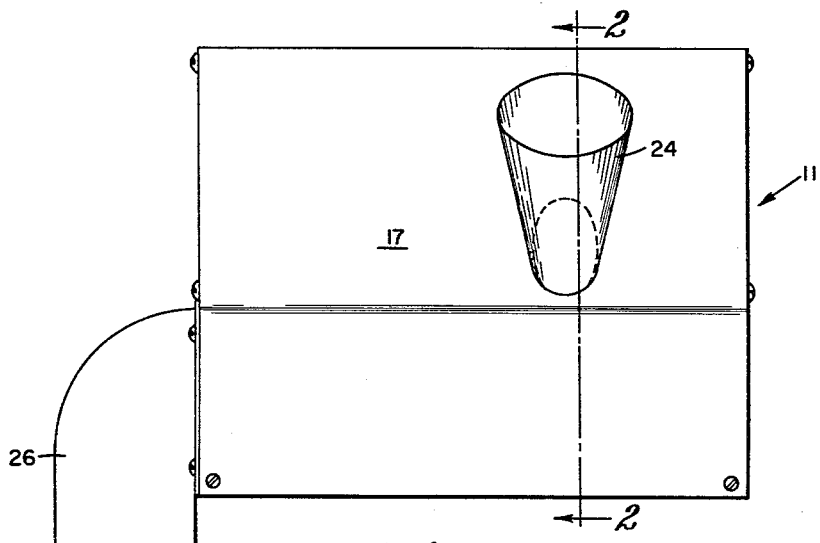
FIG. 1 is a front elevation of the machine of my invention.

The machine of my invention comprises a housing, generally indicated by the numeral 11; a casing generally indicated by the numeral 12 into which whole peeled potatoes are discharged; a knife assembly by which the whole potatoes are cut into slabs, generally indicated by the numeral 13; a conveyor assembly, generally indicated by the numeral 14, which carries a multiplicity of knives for cutting the slabs into frying size pieces and driving mechanism, generally indicated by the numeral 16, by which the movable parts of the machine are driven.

The housing includes a front wall 17, a top wall 18, a bottom wall 19, side walls 21, only one of which is shown, and a rear wall (not shown). The housing walls may be supported by suitable structural elements some of which have been indicated by the numeral 22. The structure may be supported by legs (not shown) at a suitable height for use.

The front wall of the housing has an opening 23 for the reception of an intake chute 24 welded to the margins of the opening. Whole peeled potatoes are dropped into chute 24 and are discharged into the casing 12. The housing also carries a discharge chute 26 through which the sliced potatoes are discharged to a place of collection.

The casing 12 includes a front wall or shroud 27 (FIG. 2) having an opening 28A through which the whole peeled potatoes fall from the intake chute 24 and a circumferential wall 28 which is preferably spirally arranged with respect to an axis of rotation to be later defined. The casing 12 is rigidly connected to a member 29, constituting the rear wall of the casing, carried by the structural elements 22 as shown at 31.

Figure 3:
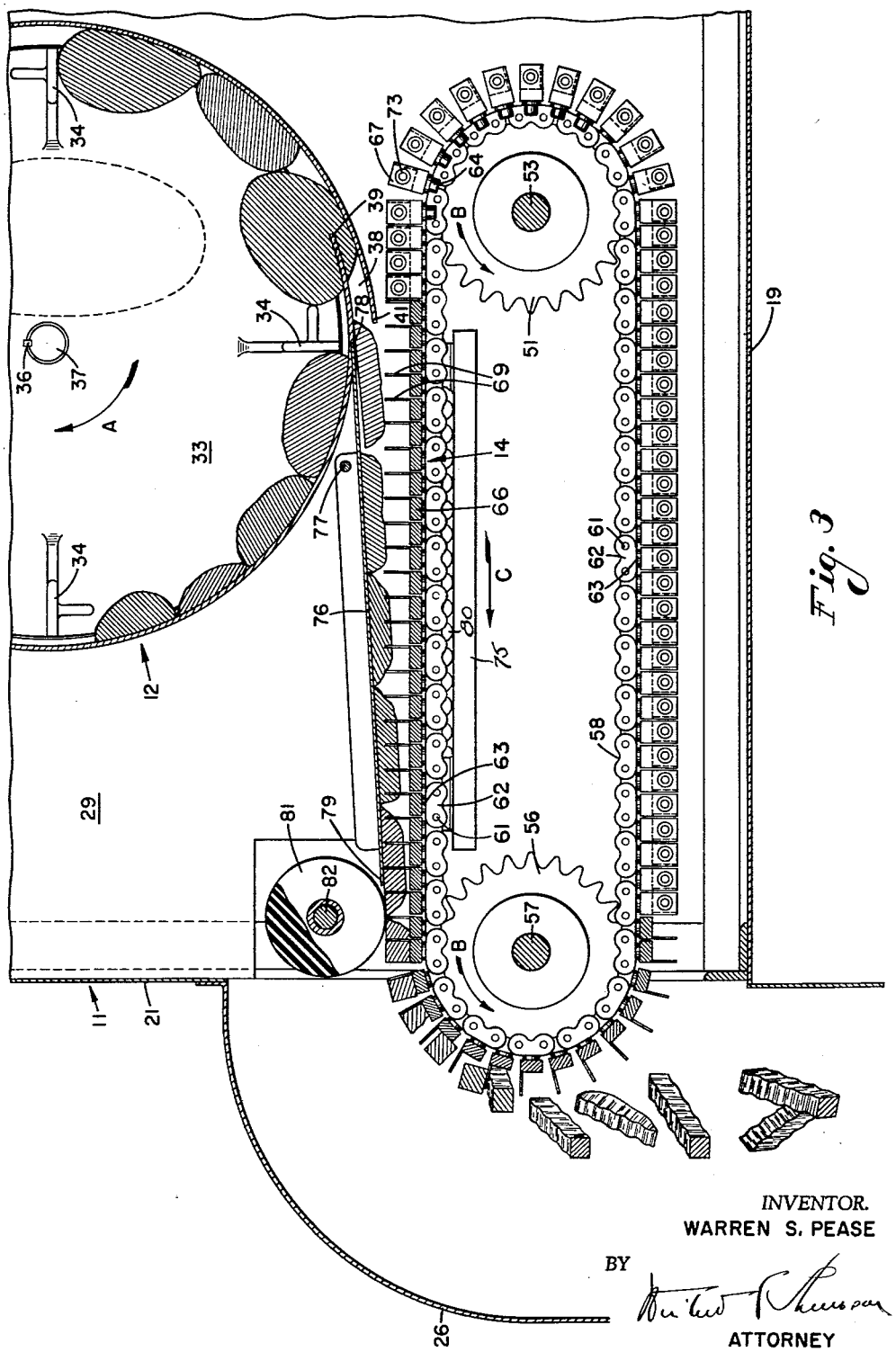
FIG. 3 is a sectional view taken substantially on the line 3—3 of FIG. 2 in the direction indicated by the arrows.

Extending through an opening 32 in the rear wall of the casing 12 is a disc 33 which carries a plurality of propelling elements 34. The propelling elements 34 extend from the disc 33 forwardly into the casing and are adapted to engage and propel the potatoes as shown in FIG. 3. The disc 33 is keyed as shown at 36 to a drive shaft 37 driven in a manner presently to be described.

The axis of the shaft 37 is the axis with respect to which the wall 28 is spirally related. The spiral arrangement of the wall 28 provides a gap 38 through which slabs of potatoes are driven by the propelling means or blades 34.

The gap is defined by the inner end 39 and the outer end 41 of the peripheral wall 28. Mounted on the inner end of the peripheral wall 28 is a knife 42 (FIG. 2). The knife 42 may be provided with a straight cutting edge to produce conventional slabs of potatoes for French frying. However, preferably the knife is fluted as shown to produce what may be termed "crinkled" potato slabs which are later cut as will presently appear, to produce "crinkled" frying size pieces of potatoes. The flutes of the knife 42 taper toward the forward edge to form a thin sharpened cutting edge. In an end or sectional view (FIG. 2) the cutting knife 42 resembles a sine wave.

The edges of the slab cutting knife 42, as indicated at 43, are unsharpened and fitted into annular slots formed respectively in the plate or wall 29 and the forward wall or shroud 27 of the casing. The wall 27 carries a knife mounting fixture 44 to which the knife is secured as by screws 46.

It will now be understood that whole peeled potatoes are more or less continuously fed into the casing through the intake chute 24 and are picked up and rotated by the paddles or potato propelling means 34. As will be observed from FIG. 3, the potato propelling elements force the potatoes against the knife 42. These slabs are discharged through the gap 38 into a position such that they will be picked up by the conveyor 14 as will presently appear.

Referring now to FIGS. 2 and 3, a pair of sprockets 51 are mounted in spaced relation and keyed, as indicated at 52, to a shaft 53. The sprockets are held in position longitudinally of the shaft by set screws 54. A second pair of spaced sprockets 56 (FIG. 3) are mounted on and keyed to a shaft 57. The sprockets 51 and 56 carry chains 58 and 59. The chains comprise the usual pivot pins 61 and links 62.

Figure 4:
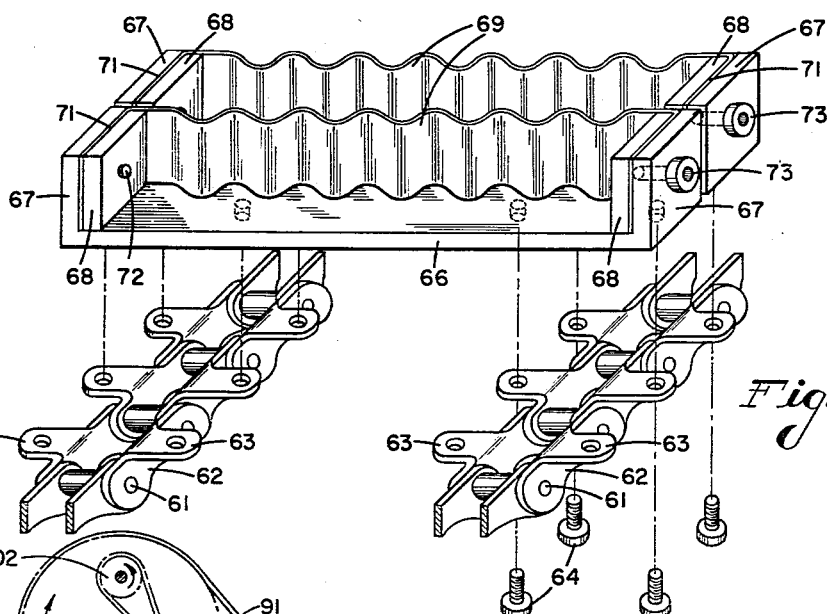
FIG. 4 is a perspective partly exploded view showing how the slicing knives are mounted on the conveyor.

As shown most clearly in FIG. 4, the links 62 have flanges 63 adapted to receive screws 64 by which a transverse knife supporting plate 66 is secured to the flanges. It will be understood that the flanges of each pair of links transversely of the chains carries a plate 66 so that the number of plates correspond to the number of links of the chain. The plates have vertically extending side walls 67 for the reception of knife mounting blocks 68. Each plate carries a knife blade 69. The ends of the knife blades are turned or bent, as indicated at 71, and confined between the blocks 68 and the inner sides of the vertical walls 67 of the plate 66. The blocks 68 and the vertical walls 67 are thread and the turned ends of the knives apertured to receive the threaded ends of screws 72 which may be finger operated as shown at 73. The knives 69 are made somewhat shorter than the distance between the inner faces of the vertical walls 67 so that upon tightening the screws 72 the knives 69 may be placed under tension. If desired, the arrangement may be similar to that shown in Patent No. 2,884,974, mentioned above.

It will now be apparent that when the propelling elements 34 are rotated in the direction of the arrow A in FIG. 3, slabs of potatoes are discharged through the gap 38 and fall upon the knives 69. The sprockets 51 and 56 are driven in the direction of the arrow B of FIG. 3. A plate 76 is carried by the frame of the machine, as indicated at 77, and extends from adjacent the gap, as shown at 78, in the direction of movement of the conveyor substantially to the sprocket 56 as indicated at 79.

At point 78 of the plate 76, the gap or distance between the upper edges of the knives 69 and the lower face of the plate 76 is relatively large. At the point 79 the plate is in close proximity to the upper edges of the knives. As the slabs are picked up by the knives due to the decreasing gap between the lower face of the plate 76 and the upper ends of the knives 69, the slabs of potatoes are forced downardly through the knives as will be apparent from an examination of FIG. 3.

Just beyond the end 79 of the plate 76, a resilient roller 81 is provided which is mounted upon a shaft 82. The roller is free to rotate but is not driven. Resilient roller 81, which may be made of rubber or other suitable material, presses downward on the potato slabs and insures their severance by the knives 69 into individual frying size pieces.

As will presently appear, both sprockets 51 and 56 are driven. The driving of both sprockets holds the upper runs of the chains taut so that the knives 69 extend substantially vertical and in substantially fixed, spaced, parallel relation to each other as the slabs are cut. Moreover, the upper run of the chain is supported by a plate 75 and rollers 80 carried by angle irons 85. As the plates 66 which carry the knives 69 reach the sprocket 56 the knives are spread apart and no longer remain parallel to each other. The increased spacing of the knives frees the slices of potatoes and they drop out of the conveyor into the discharge chute 26.

The mechanism, generally indicated by the numeral 16, for driving the propelling elements 34 and the conveyor comprises a motor 86, the shaft 87 of which has a pulley 88 rigidly secured thereto. The shaft 37 has a large pulley 89 rigidly mounted thereon and a V-belt 91 passes over the pulleys 88 and 89. Bearings 92 carried by angle iron 93 extending across the machine support the shaft. A sprocket 94 is rigidly secured to the shaft 37 as indicated at 96, and over it a chain 97 passes. The shafts 53 and 57 are supported in bearings 95 carried by channel irons 98 extending across the machine.

Sprockets 99 and 100 (not shown) are rigidly secured respectively to the shafts 53 and 57 as indicated at 101. The chain 97 also passes over the sprockets 99 and 100 (not shown) and also over sprocket 102 secured, as indicated at 103, to a shaft 104. An angle iron 106 extends across the machine, is supported in the frame and supports a bearing assembly 107 for the shaft 104. The shaft 104 extends through a bore in the angle iron 106 and has its other end threaded to receive a nut 108.

Figure 5:
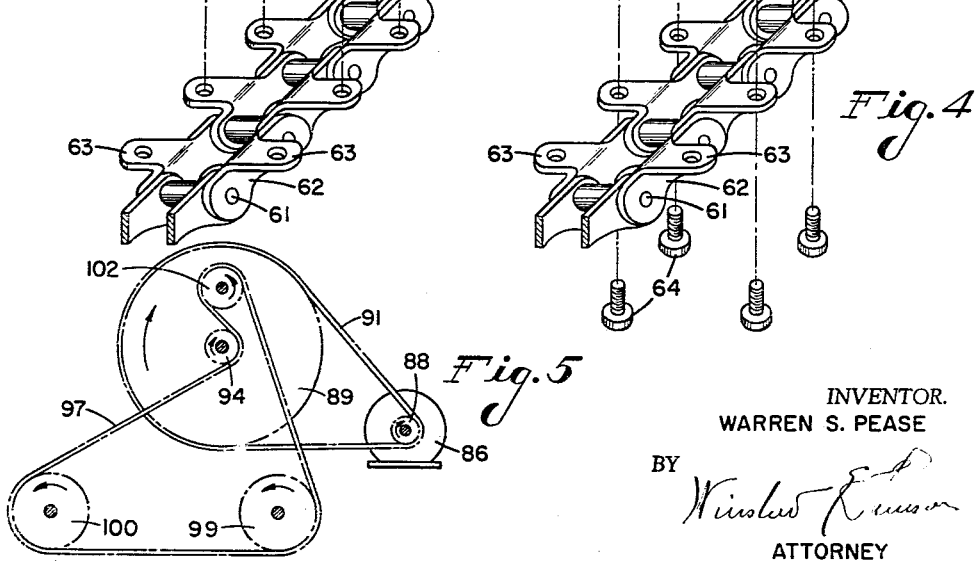
FIG. 5 is a diagrammatic view of the drive for the casing and the slicing conveyor.

In FIG. 5 I have shown diagrammatically the drive from the motor 86 to the pulley 89 and the drive to sprockets 99 and 100 which drive the conveyor chain sprockets 51 and 56. I have also shown the reversing sprocket 102. The purpose of the reversing sprocket 102 is so that the propelling elemnts 34 will be driven in the direction of the arrow A (FIG. 3) while the conveyor 14 moves in the direction of arrow C (FIG. 3) that is, in a direction away from the gap 38.

It will now be understood that as the plate 33 and the propelling elements 34 are rotated in the direction of the arrow A of FIG. 3 the propelling elements will force the potatoes against the knife 42. As the slabs of potatoes are cut they are discharged through the gap 38 and fall upon the vertically held knives. The knives are held vertical and in fixed spaced relation by reason of the fact that both the sprockets 51 and 56 are driven and the upper run of the chain and the plates 66 are supported. As the conveyor continues to move, the plate 76 forces the slabs of potatoes down between the knives and the slabs are cut into frying size pieces. It will be understood that the peripheral sped of the revolving paddles 34 in feet per minute is the same as the lineal speed of the knives 69. The resilient roller 81 insures the complete severance of the individual pieces from each other. Thereafter as the slabs move around the sprocket 56 due to the increased spacing of the knives, the pieces are discharged as shown in FIG. 3.

While I have shown and described the preferred forms of my invention, it will be appreciated that various changes may be made, particularly in the form and relation of parts, without departing from the spirit of the invention as set forth in the appended claims.

I claim:

1. A machine for slicing potatoes comprising, in combination, a stationary casing into which whole peeled potatoes are discharged, potato propelling means mounted in said casing, means for rotating said propelling means about an axis of rotation, said casing having a wall extending about said axis with the wall having a gap, a stationary cutting element mounted at the side of said gap closest to said axis, the potatoes being urged by said propelling means against said cutting element for cutting the potatoes into slabs, a multiplicity of knives arranged to continuously pick up said slabs as they are discharged through said gap, conveyor means on which said knives are mounted in spaced relation for continuously moving said knives past said gap, means extending substantially from said cutting element to said knives for guiding said slabs from said gap to said knives and for forcing said slabs between said knives to cut the slabs into frying size pieces, said conveyor means includes means for widening the spacing between said knives after they have passed said gap to enable the sliced pieces to drop from between said knives.

2. A machine for slicing potatoes comprising, in combination, a casing into which whole peeled potatoes are placed, said casing having a gap through which sliced slabs of potatoes are discharged, means rotatably mounted in said casing for rotating the potatoes relative to said gap, about a first axis, a first knife at said gap against which the potatoes are impaled as they are discharged through said gap to cut them into slabs, an endless conveyor having a multiplicity of spaced knives projecting outwardly therefrom, said conveyor being mounted and driven by spaced means having axes spaced below said first axis and in a position such that potatoes cut by said first knife and discharged through said gap are received by an upper run of said multiplicity of knives and stationary means above the upper run of knives extending from said cutting element for forcing the potato slabs downwardly through said knives to slice them into frying-sized pieces, said pieces being released from between said knives as the space between adjacent knives widens during passage of said knives about one of said second axes.

3. A machine in accordance with claim 2 in which a resilient roller is rotatably mounted above the upper run of knives adjacent the discharge end of the conveyor, said roller being mounted in such close relationship to the path of movement of the knives that it presses upon the potatoes and insures the severance of the pieces into frying-sized pieces.

4. A machine in accordance with claim 2 including means for controlling relative speed of movement of the potatoes through the gap to the speed of movement of the conveyor so that the potatoes are impaled on said first knife at substantially the same lineal speed as the lineal speed of movement of said multiplicity of knives and in which a resilient roller is rotatably mounted above the upper run of knives adjacent the discharge end of the conveyor, said roller being mounted in such close relationship to the path of movement of the knives, that it presses upon the potatoes and insures the severance of the pieces of potato into frying-sized pieces.

5. A machine in accordance with claim 2 including means controlling the speed of said potato rotating means to discharge potatoes at said gap at substantially the same lineal speed as the lineal speed of said multiplicity of knives.

6. A machine in accordance with claim 2 including means for supporting the lower side of said upper run of the conveyor.

References Cited in the file of this patent
UNITED STATES PATENTS

| | | |
|---|---|---|
| 373,431 | Beaupre | Nov. 22, 1887 |
| 1,474,717 | Holler | Nov. 20, 1923 |
| 1,667,321 | Kintzele | Apr. 24, 1928 |
| 2,187,957 | Urschel | Jan. 23, 1940 |
| 2,612,852 | Morrison | Oct. 7, 1952 |
| 2,832,387 | Woodward | Apr. 29, 1958 |